United States Patent
Lecheler et al.

(10) Patent No.: US 7,042,166 B2
(45) Date of Patent: May 9, 2006

(54) CIRCUIT ARRANGEMENT FOR OPERATING ELECTRIC LAMPS

(75) Inventors: Reinhard Lecheler, Neuburg/Donau (DE); Oskar Schallmoser, Ottobrunn (DE)

(73) Assignee: Patent - Treuhand - Gesellschaft fuer Elektrische Gluehlampen mbH, Munich (DE)

( * ) Notice: Subject to any disclaimer, the term of this patent is extended or adjusted under 35 U.S.C. 154(b) by 10 days.

(21) Appl. No.: 11/014,861

(22) Filed: Dec. 20, 2004

(65) Prior Publication Data

US 2005/0134201 A1 Jun. 23, 2005

(30) Foreign Application Priority Data

Dec. 19, 2003 (DE) .................... 103 59 882

(51) Int. Cl.
*H05B 37/02* (2006.01)

(52) U.S. Cl. ............ 315/224; 315/219; 315/246; 315/209 R; 315/291; 315/DIG. 7; 363/56.03

(58) Field of Classification Search ............ 315/219, 315/224, 244, 246, 247, 225, 291, 209 R, 315/DIG. 7; 363/56.03, 56.1, 98, 101, 108, 363/109, 124, 132, 56.08
See application file for complete search history.

(56) References Cited

U.S. PATENT DOCUMENTS

| | | | |
|---|---|---|---|
| 4,870,327 A * | 9/1989 | Jorgensen | 315/307 |
| 5,068,570 A * | 11/1991 | Oda et al. | 315/128 |
| 5,604,410 A | 2/1997 | Vollkommer et al. | 315/246 |
| 5,740,021 A * | 4/1998 | Lecheler et al. | 363/37 |
| 6,034,470 A | 3/2000 | Vollkommer et al. | 313/485 |
| 6,108,220 A | 8/2000 | Franke | 363/37 |
| 6,323,600 B1 | 11/2001 | Statnic et al. | 315/209 R |
| 6,445,137 B1 | 9/2002 | Okamoto et al. | 315/246 |
| 6,717,374 B1 * | 4/2004 | Krummel | 315/291 |
| 6,731,078 B1 * | 5/2004 | Huber et al. | 315/307 |
| 2002/0047640 A1 | 4/2002 | Ito et al. | 315/307 |

FOREIGN PATENT DOCUMENTS

WO WO 90/09729 8/1990

OTHER PUBLICATIONS

Abstract, JP 10 315849 (Dec. 2, 1998).

* cited by examiner

*Primary Examiner*—Haissa Philogene
(74) *Attorney, Agent, or Firm*—Robert F. Clark

(57) ABSTRACT

The invention relates to a circuit arrangement for operating electric lamps (5), in particular dielectric barrier discharge lamps, having an input stage (1) in the form of a voltage-increasing converter, in particular a step-up converter, and at least one subsequent further circuit stage (2), for example a flyback converter in the form of a pulse stage. An intermediate circuit overcurrent protection device (3) is connected between the step-up converter (1) and the flyback converter (2) and protects the flyback converter (2) in the event of a fault, specifically in particular if the input overcurrent protection device (1) does not respond.

12 Claims, 1 Drawing Sheet

CIRCUIT ARRANGEMENT FOR OPERATING ELECTRIC LAMPS

TECHNICAL FIELD

The invention is based on a circuit arrangement for operating electric lamps, for example mercury low-pressure discharge lamps or, in particular, also dielectric barrier discharge lamps.

Suitable for operating such lamps are, inter alia, electronic ballasts which comprise two- or multi-stage circuit arrangements. A possible input stage is in this case a voltage-increasing converter, for example a step-up converter. In particular when such lamp/ballast systems are incorporated in other devices, for example for the purpose of backlighting liquid crystal displays or as a lighting system in office machinery equipment, such as printers or scanners, which are supplied with lower DC voltages, for example 12, 19 or 24 volts, from external switch-mode power supplies, the problem may arise that, in the event of a fault, for example in the event of an overload, a short circuit or the like, the input-side fuse of the ballast does not respond. This problem occurs in particular when the external switch-mode power supply limits the current in the event of a fault to a value which is below the response threshold of the input fuse. Although during normal operation the output-side current of a voltage-increasing converter is lower than the input current by the factor of the voltage increase, almost all of the fault current flowing in its input in the event of a fault flows in its output and as a result into the subsequent circuit stage. This may result in local overheating in the circuit up to the point at which the entire ballast is ignited. In order to prevent this, temperature protection devices have until now been used which are, however, relatively complex and thus expensive.

BACKGROUND ART

U.S. Pat. No. 6,323,600 discloses a circuit arrangement for operating a dielectric barrier discharge lamp which comprises a flyback converter. With the aid of the flyback converter, pulsed voltage sequences are produced, allowing particularly efficient operation of the dielectric barrier discharge lamps.

WO 01/11927 discloses a circuit arrangement for operating two or more dielectric barrier discharge lamps. This circuit arrangement has a common input stage and its own associated output stage in each case for each lamp.

DISCLOSURE OF THE INVENTION

The object of the present invention is to provide a circuit arrangement having improved protection in the event of a fault.

This object is achieved by a circuit arrangement for operating electric lamps comprising an input stage and at least one subsequent further circuit stage, the input stage being in the form of a voltage-increasing converter which produces, at its output, an intermediate circuit voltage which is higher than an input voltage applied to its input, the intermediate circuit voltage acting as the input voltage for the subsequent circuit stage, which, in the event of a fault, allows the fault current flowing in its input to also flow almost completely in its output and as a result into the subsequent circuit stage, and an intermediate circuit overcurrent protection device being connected between the input stage and the subsequent circuit stage.

In addition, protection is claimed for a lighting system having an electric lamp, in particular a dielectric barrier discharge lamp, which is connected to the circuit arrangement according to the invention.

The input stage of the circuit arrangement according to the invention is in the form of a voltage-increasing converter, for example a step-up converter (boost converter), which produces, at its output, an intermediate circuit voltage which is higher than an input voltage applied to its input. This intermediate circuit voltage in turn acts as the input voltage for the subsequent circuit stage, for example a pulse stage, in particular a flyback converter, single-ended forward converter or a half-bridge.

The use of a voltage-increasing converter is particularly advantageous during pulsed operation of dielectric barrier discharge lamps. It is thus possible to produce the optimum input voltage for the subsequent pulse stage even in the case of external voltage supplies with relatively low voltages. As a result, in turn, the pulse stage may be matched optimally to the dielectric barrier discharge lamp connected to it, and, as a result, the overall efficiency of the ballast/lamp system can be optimized.

The intermediate circuit overcurrent protection device connected between the input stage and the subsequent circuit stage is rated lower such that its threshold response value is lower than the rated current of the ballast, than the threshold response value of an input overcurrent protection device which may additionally be connected to the input stage. Suitably selected fuses may be used for both fuses. In any case, the intermediate circuit overcurrent protection device blows in the event of a fault in the subsequent circuit stage. This is particularly advantageous, since this circuit stage (in a two-stage circuit arrangement this is the final output stage connected to the lamp) interacts directly with the lamp and its surroundings, and lamp faults, for example a broken lamp, high-voltage flashovers or application faults, for example cable insulation damaged during installation, have a direct effect on the electronic components in the output stage. The probability of a fault occurring in the output stage is thus considerably greater than in the input stage.

BRIEF DESCRIPTION OF THE DRAWINGS

The invention will be explained in more detail below with reference to an exemplary embodiment. The FIGURE shows:

A lighting system having a two-stage circuit arrangement according to the invention which is connected to a dielectric barrier discharge lamp.

BEST MODE FOR CARRYING OUT THE INVENTION

Figure 1:
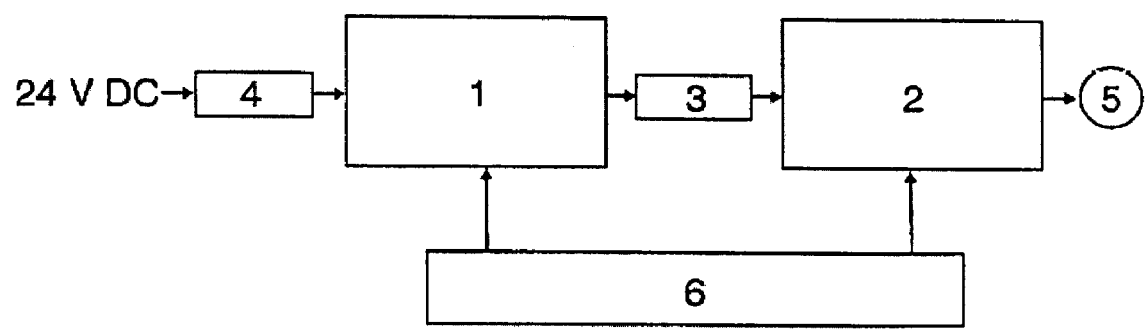

The FIGURE shows a schematic illustration of a lighting system for the pulsed operation of a dielectric barrier discharge lamp using functional blocks. It essentially comprises a step-up converter 1 as the input stage, a flyback converter 2 as the output stage for the purpose of producing radio-frequency high-voltage pulses, an intermediate circuit overcurrent protection device 3, which is connected between the step-up converter 1 and the flyback converter 2, an input overcurrent protection device 4, which is connected in the input which is supplied with a 24 volt DC voltage from an external switch-mode power supply (not shown), a flat dielectric barrier discharge lamp 5, which is connected to the output of the flyback converter 2, and a control circuit 6, by means of which the values, matched to the dielectric barrier discharge lamp 5, for the operating parameters such as pulse and pause duration, dimmer operation etc. are preselected. For further details relating to the functional blocks, which are already known as such to those skilled in the art, reference is made to the relevant prior art, since the specific design of the functional blocks is in any case of secondary importance for understanding of the invention. Details relating to flat dielectric barrier discharge lamps can be found, for example, in U.S. Pat. No. 6,034,470, details relating to pulsed operation of these lamps in U.S. Pat. No. 5,604,410 and relating to flyback converters for dielectric barrier discharge lamps in U.S. Pat. No. 6,323,600. already cited in the introduction.

The lighting system is designed for an electric power consumption of 65 W, which results at the mentioned input voltage of 24 V in a rated input current of approximately 2.7 A. For the input overcurrent protection device 4, a fuse having a rated current of 5 A is selected, for example the surface-mounted fuse No. 419 SM by Wickmann. The step-up converter 1 converts the DC voltage of 24 V applied to its input to an intermediate circuit DC voltage of 70 V produced at its output. This results in a rated intermediate circuit current of 0.93 A there. For the intermediate circuit overcurrent protection device 3, a fuse having a rated current of 2 A is thus selected. The above-mentioned external switch-mode power supply provides a rated current of 4 A and, in the event of a fault, a current limited to 5 A. In the event of a fault, for example in the event of a short-circuit in the flyback converter 2, the intermediate circuit overcurrent protection device 3 interrupts the circuit when the current significantly exceeds the rated value of 2 A and thus effectively prevents local overheating of the circuit arrangement. Without the 2 A intermediate circuit overcurrent protection device 3, a current of 5 A would flow unimpeded in the event of a short circuit, without the 5 A input overcurrent protection device 4 responding reliably, and as a result the circuit arrangement would be damaged or even completely destroyed.

What is claimed is:

1. A circuit arrangement for operating electric lamps comprising
    an input stage and at least one subsequent further circuit stage,
        the input stage being in the form of a voltage-increasing converter which
            produces, at its output, an intermediate circuit voltage which is higher than an input voltage applied to its input,
        the intermediate circuit voltage acting as the input voltage for the subsequent circuit stage,
        in the event of a fault, allows the fault current flowing in its input to also flow almost completely in its output and, as a result, into the subsequent circuit stage, and
    an intermediate circuit overcurrent protection device being connected between the input stage and the subsequent circuit stage.

2. The circuit arrangement as claimed in claim 1, the input side of the input stage being connected to an input overcurrent protection device.

3. The circuit arrangement as claimed in claim 2, the protection devices being rated such that the threshold response value for the intermediate circuit overcurrent protection device is lower than the threshold response value for the input overcurrent protection device.

4. The circuit arrangement as claimed in claim 2, the intermediate circuit overcurrent protection device and, possibly, also the input overcurrent protection device being in the form of fuses.

5. The circuit arrangement as claimed in claim 1, the input stage being in the form of a step-up converter.

6. The circuit arrangement as claimed in claim 1, the circuit stage following the input stage being in the form of a pulse stage.

7. The circuit arrangement as claimed in claim 6, the pulse stage being a flyback converter.

8. A lighting system having an electric lamp which is connected to a circuit arrangement having the features of claim 6.

9. The lighting system as claimed in claim 8, the electric lamp being in the form of a dielectric barrier discharge lamp.

10. The lighting system as claimed in claim 8, the dielectric barrier discharge lamp being connected to the output of the pulse stage.

11. The circuit arrangement as claimed in claim 3, the intermediate circuit overcurrent protection device and, possibly, also the input overcurrent protection device being in the form of fuses.

12. A lighting system having an electric lamp which is connected to a circuit arrangement having the features of claim 1.

* * * * *